US 6,641,659 B1

(12) United States Patent
Obregon Pena et al.

(10) Patent No.: US 6,641,659 B1
(45) Date of Patent: Nov. 4, 2003

(54) ADDITIVE FOR STABILIZING AND PETRIFYING ROCKS

(76) Inventors: Eduardo Amado Obregon Pena, Boulevard de la Conspiracion No. 11, Fraccionamiento La Luz, San Miguel de Allende Guanajuato (MX), CP 37747; Gerasim Seredin Storb, Km. 4 Carretera San Miguel Allende-Quretaro., Fraccionamiento La Luz, Seccion "G", San Miguel de Allende, Guanajuato (MX), CP 37747

( * ) Notice: Subject to any disclaimer, the term of this patent is extended or adjusted under 35 U.S.C. 154(b) by 0 days.

(21) Appl. No.: 09/857,111

(22) PCT Filed: Dec. 14, 1999

(86) PCT No.: PCT/MX99/00037

§ 371 (c)(1),
(2), (4) Date: May 30, 2001

(87) PCT Pub. No.: WO00/35823

PCT Pub. Date: Jun. 22, 2000

(30) Foreign Application Priority Data

Dec. 16, 1998 (MX) .............................................. 9810829

(51) Int. Cl.⁷ .............................................. C04B 14/26
(52) U.S. Cl. ...................... 106/713; 106/734; 106/736; 106/738; 106/819
(58) Field of Search ................................. 106/713, 734, 106/736, 738, 819

(56) References Cited

U.S. PATENT DOCUMENTS 5,728,208 A  *  3/1998  Rusinov

FOREIGN PATENT DOCUMENTS

| EP | 0059444 | 9/1982 |
| ES | 453799 | 11/1977 |

* cited by examiner

*Primary Examiner*—Paul Marcantoni
(74) *Attorney, Agent, or Firm*—Durando Birdwell & Janke, P.L.C.

(57) ABSTRACT

The invention relates to an additive made up of chemical substances, non toxic for the human being neither for the environment, that stabilizes the attle without necessity of cooking neither compression, applicable for constructions/buildings in general, and specially, for housings of social interest, to be resistant, economic, stable, acoustic, thermal, etc.

The material for construction including this additive, as well as its preparation process are also disclosed.

11 Claims, No Drawings

ADDITIVE FOR STABILIZING AND PETRIFYING ROCKS

FIELD OF THE INVENTION

The present invention relates to an additive to stabilize mixtures comprising attle and Portland cement, for employing the same in the construction/building industry.

BACKGROUND OF THE INVENTION

It has not been possible today to stabilize attle with the strength or resistance characteristics as well as with physical and mechanical properties that are to be obtained by applying the additive of the invention.

To date the attle has been used in natural form, only as inert filling, base for roads, non structural uses. However, new applications have been discovered once blended with the additive, which can be applicable to load walls, columns, bases, foundations, roofs etc.

DESCRIPTION OF THE INVENTION

The invention comprises an additive for stabilizing and to petrifying attle.

The mentioned additive that, in combination with water and a portion of the cement, stabilizes and petrifies the attle, comprises a mixture of some or all of the elements mentioned below, depending on the characteristics and physical and chemical state of the attle; being the elements:

10 to 34% of sodium hipoclorite in solution at 5%; 5 to 16% of sodium perborate; 3 to 12% of sodium hydroxide; 1 to 5% of calcium oxide; 7 to 17% of pentahydrated borax; 12 to 35% of sodium carbonate; 20 to 35% of calcium hipoclorite in solution at 5%; 98% of sodium persulfate as catalyst.

The most remarkable advantages are:

A resistance similar to concrete is obtained, with smaller quantity of cement, obtaining a very economic mixture.

Indeed, the result of the laboratory tests made by the Mexican Institute of Cement and Concrete, in a simple compresion test, after 28 days, in two equal samples containing a rate of one part of cement for nine parts of attle (sand-silt material SM, according to the Unified System of Soil Classification SUCS), a resistance of 32 f'c, kg/cm$^2$ in the sample without the additive was obtained, while in the sample with the additive a resistance of 60 f'c, kg/cm$^2$ was obtained, representing an increment in the material strengh of approximately 88%.

In another test made by the same Laboratory, a strength of 217 kg/cm2 was obtained in a mixture of one part of cement for 4.5 parts of attle, after 90 days, while in a mixture of the same rate described above, without additive, a resistance of 140 kg/cm2 was obtained, 65% lower as compared to the mixture enriched with the additive.

The best method to carry out the claimed invention, comprises mixing a rate of 539 grams of additive in 200 liters of water, in a cubic meter of attle and 100 to 300 kgs. of cement, depending on the wanted strength or resistance.

The scope of the technical study comprises a group of tests carried out in the Central Laboratory of the Mexican Institute of Cement and Concrete (IMCYC) in order to present to the engineer/architect, the mechanical properties of the material as well as some durability features using sand-silt soils, SM, according to the Unified System of Soil Classification (SUCS). It is important to mention that the rate of the mixtures was carried out by volume and not by weight.

On the other hand, with the purpose of evaluating the efficiency of the additive (MAXEh™) in the mixtures of stabilized soil with Portland cement, sample witnesses were used to verify in this way its behavior.

The main tests carried out were the following:
1.—Simple Compression Test.
1.1.—72 cylindrical specimen of 15×30 cm., were made to be tested in pairs at 6 ages (3,7,28,56,90 and 180 days), three cement contents were used with the purpose of showing the evolution of the strength over the time.

The following Mexican Standards were used as references: NMX-C-83 (determination of the strength or resistance to simple compression), NMX-C-109 (pitching of cylindrical specimen), NMX-C-156 (fresh concrete-tempering determination), NMX-C-10 160 (Concrete, Elaboration and curing at work of specimen), NMX-C-161 (Sampling of fresh concrete) and NMX-C-162 (Concrete, Determination of unitary weight, yield calculation and content of air in fresh concrete).

1.2.—9 piles of 16×50×56.7 cm. were prepared to be tested for compression at age of 28 days, using a cement content.

2.—Test of Design Resistant Shear Stress.
2.1.—9 walls of 16×50×56.7 were made to be tested for compression along their diagonal at age of 28 days using a cement content.

3.—Laboratory Tests.
3.1.—Physical Properties of the Material.

The material used in the laboratory tests comprises the following: breakstone 33%, sand 63% and fines 4%. The coarse material bigger than 2" was retired when elaborating the specimens.

The maximum dry volumetric weight was 1,733 kg/m$^3$ according Porter test, with humidity of 11/.6% in accordance with the static compactation test of the SCT., Book 6.0102 002-K.06.

3.2.—Properties of the material.

The limits of consistency were: Plastic Limit 14.1% and the Plastic Index 5.7%. The linear contraction was 0.40%.

The soil was classified as a clear brown silt sand and it is comprised into the SUCS group as SM.

3.7.—Dosage of Additive MAXEh™

The dosage of Additive MAXEh™ was carried out by the making of cylindrical specimen of 15×30 cm. at a rate of 2.84 gr/lt of total water of the mixture for the rate 1 to 4.5. In other experiment, 142 g were dosed per each 50 lt. of water in solution, for the rates 1 to 9 and 1 to 18.

3.7.—Simple Compression Test.

The average resistance of two especimenes of 15×30 cm. was 60 kg/cm2 after 28 days, using a cement content with a rate 1 to 9 (a part of cement per nine parts of soil in volume) and additive MAXEh™. For the specimen witnesses, the strength or resistance to simple compression was 32 kg/cm2. The curing was carried out starting from the second day of retiring the formwork, in humid camera.

Finally, the variation of the resistance to simple compression of two specimen after 28 days in the mixture with additive MAXEh was 57 kg/cm2 to 63 kg/cm2, and no variation ocurred for the specimen of witness mixture.

IV.—Conclusion

The results are given for the tested material, namely for sand-lime soils classified into the group SUCS as SM.

The resistance to simple compression of the cylindrical specimen of 15×30 was 60 kg/cm2 after 28 days. The specified resistance was 65% kg/cm2, thereby the specimen had 92% of the resistance to the project.

V. Observations made in the Central Laboratory of the Mexican Institute of Cement and Concrete with regard to the Technical Study of mechanical and physical properties of a group of soil mixtures stabilized with Portland cement and Additive MAXEh for using in the construction.

5.1. It was difficult in some cases to control tempering in laboratory since it depends on the natural humidity of the material.

5.2. In general, the mixtures presented good workability and some of them presented few bledding if any.

5.3. It was observed that, for practical purposes, the additive MAXEh increases the resistance to simple compression up to 88%, when a rate cement-soil 1:9 is used.

Having described our invention sufficiently, we consider it as novelty, and for the same reason we claim as our exclusive property, the subject matter contained in the following claims:

What is claimed is:

1. An additive for stabilizing and petrifying attle, comprising:

10 to 34% of sodium hypochlorite in solution at 5%; 4 to 15% of sodium perborate; 2 to 8% of sodium sulfate; 5 to 16% of calcium carbonate; 3 to 12% of sodium hydroxide; 1 to 5% of calcium oxide; 7 to 17% of pentahydrated borax; 12 to 35% of sodium carbonate; 20 to 35% of calcium hypochlorite in solution at 5%, and 98% of sodium persulfate as a catalyst.

2. An additive according to claim 1, wherein said additive is used in a mixture of attle and cement to produce a chemical reaction that petrifies the components of the mixture, giving as a result a stable material of increased resistance or strength.

3. An additive according to claim 1, wherein the additive is combined with a mixture of cement, water and attle to stabilize and petrify said mixture without heating.

4. An additive according to claim 1, wherein said additive is used to increase the resistance of a petrified and stabilized mixture of cement, water and attle.

5. A material for construction comprising a mixture of attle, cement and water, wherein said material contains an additive comprising: 10 to 34% of sodium hypochlorite in solution at 5%; 4 to 15% of sodium perborate; 2 to 8% of sodium sulfate; 5 to 16% of calcium carbonate; 3 to 12% of sodium hydroxide; 1 to 5% of calcium oxide; 7 to 17% of pentahydrated borax; 12 to 35% of sodium carbonate; 20 to 35% of calcium hypochlorite in solution at 5%; 98% of sodium persulfate as a catalyst.

6. The material for construction according to claim 5, wherein said cement in the mixture is a Portland cement.

7. The material for construction according to claim 5, wherein said material petrifies without heating.

8. The material for construction according to claim 5, wherein the strength of said material is varied by modifying the rates of Portland cement in the mixture.

9. The material for construction according to claim 5, wherein said material produces an increased resistance after stabilization and petrification without heating.

10. A process for preparing a material for construction comprising the following steps:

a) mixing cement, water and attle;

b) agitating the mixture during a time sufficient to obtain a homogenous mixture;

c) adding an additive comprising: 10% to 34% of sodium hypochlorite in solution at 5%; 4 to 15% of sodium perborate; 2 to 8% of sodium sulfate; 5 to 16% of calcium carbonate; 3 to 12% of sodium hydroxide; 1 to 5% of calcium oxide; 7 to 17% of pentahydrated borax; 12 to 35% of sodium carbonate; 20 to 35% of calcium hypochlorite in solution at 5%; and 98% of sodium persulfate as catalyst; and d) agitating the mixture again so that the additive is dissolved.

11. A process for preparing a material for construction according to claim 10, wherein said material is used to produce an increased resistance or strength.

* * * * *